8670X
T. B. Brown.
Grain Winnower.
Patented Mar. 6, 1835.
Fig. 2.
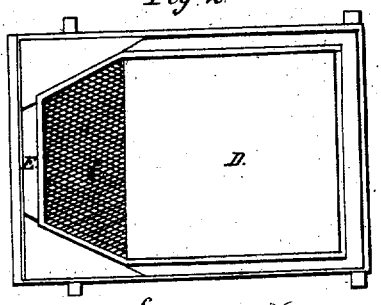
Sectional View
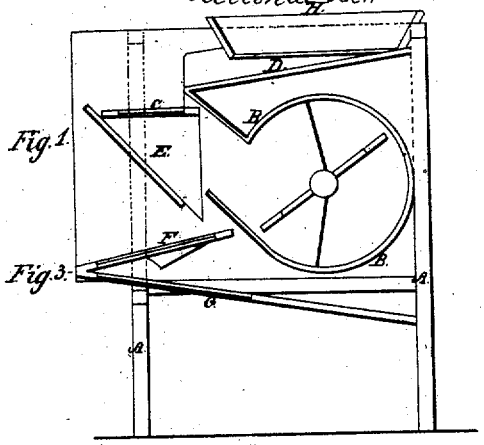
Fig. 4.
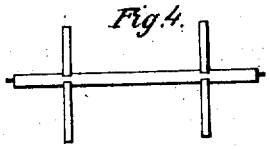
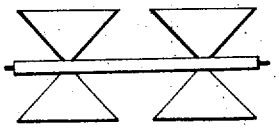

8670X Mar. 6. 1835 March 6, 1835
305

Trueman B Brown of Locke . New York

Letters Patent.

The Schedule referred to in these Letters Patent and making part of the same containing a discription in the words of the said Trueman B Brown himself of his improvement in the Winnowing Mill.

To all to whom these Presents shall come:

Be it known that I Trueman B Brown of the Town of Locke in the County of Cayuga and State of New York have invented a new and useful improvement in the Winnowing Mill for cleaning Grain, and that the following is a full and exact discription of the construction and operation of the said Machine as invented & improved by me.

1st The Body of the mill is made with a frame of timber 2 inches square. on each side are two posts 3 feet 8 inches high. the frame is 2 feet 8 inches wide connected by 2 girts. one at the top. the other 16 inches from the bottom. to this frame the boards for the sides are fastened on the inside of the frame covering it from top to bottom. and projecting at the far end of the mill (the end at which the coarse stuff and chaff leave the mill) 6 inches beyond the frame. these sides are set up 26 inches apart, 17 inches from the top and 11 from the back end of the Mill is the centre of a cylinder 18 inches in diameter on the inside extending across the mill. having an opening towards the far end of the mill 6½ inches wide. adjoining this is a passage inclining the air upwards at an angle of 43 degrees. the opening at top of which is 10 inches long 23 inches wide at the hind end and 9 inches wide at the far end. at the bottom of this passage is an opening 3 inches wide next to the cylinder. through which the grain passes on the screen. 2nd A Shoe placed under the hopper with a drop of 2 inches where the current of air comes into contact with the grain, so as to meet it in a Broken condition 5 inches from the cylinder. this shoe has a coarse screen a little wider than the top of the passage rising at the far end. 3d The first screen below the passage is so constructed as to convey the grain to the upper end of the lower screen. after it has passed through the first. thus getting the whole use of the lower and most important screen. 4th A Wheel or blower consisting of a shaft with 2 arms framed through it each of which is 5 inches from the inside of the mill to each of these arms are attached two wings crossing each other in the middle at right angles at the shaft, of such a length as to leave a space of 4 inches vacant at the middle of the shaft. The parts of the above described mill which are claimed as newly invented and as improvements for which a Patent is requested are the parts described in the 2nd 3d & 4th numbers above specified. the shaking of the screens and manner

316.

8670X of operation of the mill in other respects is the same as in the winnowing Mills in common use Exd. Witnesses — Truman B. Brown Wm. Augustus Sperrill Selecte. G. Kelsey.

(Patented March 6. 1835) (594 ante)

Drawing made